United States Patent [19]

Anstey et al.

[11] Patent Number: 4,611,535
[45] Date of Patent: Sep. 16, 1986

[54] CYLINDRICAL BALE-FORMING PRESS WITH TORQUE-LIMITING DEVICE

[75] Inventors: Henry D. Anstey, Ottumwa, Iowa; Jean Viaud, Sarreguemines, France

[73] Assignee: Deere & Company, Moline, Ill.

[21] Appl. No.: 695,318

[22] Filed: Jan. 28, 1985

[30] Foreign Application Priority Data

Jan. 27, 1984 [EP] European Pat. Off. ........ 84400187.5

[51] Int. Cl.⁴ ...................... B30B 5/06; A01D 39/00
[52] U.S. Cl. ...................................... 100/43; 100/88; 56/341; 56/10.2
[58] Field of Search .............. 100/43, 88, 89; 56/341, 56/342, 343, 344, 10.2

[56] References Cited

U.S. PATENT DOCUMENTS

| | | | |
|---|---|---|---|
| 4,257,219 | 3/1981 | Burrough et al. | 100/88 X |
| 4,391,187 | 7/1983 | Koning et al. | 100/88 |
| 4,433,619 | 2/1984 | Anstey et al. | |
| 4,545,298 | 10/1985 | Viaud | 100/88 |

*Primary Examiner*—Peter Feldman

[57] ABSTRACT

This cylindrical bale-forming press comprises sets of belts, bands or the like which define a chamber for forming a bale by rolling up crop products. At least one stationary roller drives the belts and is itself driven from a main drive shaft. Some of the guide rollers are movable and are subjected to a biasing action by hydraulic cylinders so as to maintain the belts under tension. According to the invention, a torque sensor is provided on the main drive shaft of the press and operates to provide an electrical output signal which is operatively connected to electrically responsive valve means in the hydraulic circuitry for controlling the hydraulic cylinders so as to reduce or eliminate the tension in the belts when an excessive resisting torque on the main driving shaft is sensed. In one embodiment wherein the hydraulic cylinders are associated with an expansion valve, the torque sensor is operatively connected to the expansion valve so as to lower the threshold of response of the valve in response to an excessive torque being sensed. According to a variant, an electrically responsive shunt valve which is movable to a position wherein it interconnects the opposite ends of the hydraulic cylinders may be connected in parallel with the hydraulic cylinders for actuation in response to the output signal of the torque sensor.

5 Claims, 4 Drawing Figures

CYLINDRICAL BALE-FORMING PRESS WITH TORQUE-LIMITING DEVICE

BACKGROUND OF THE INVENTION

The present invention relates generally to presses for forming cylindrical or round bales.

These presses are of a general type which is well-known and comprise sets of flexible elements such as bands, belts or the like which, by their displacement, form, by rolling up inside a chamber provided in the body of the press, a bale of generally cylindrical or round shape from harvest products, especially forage or hay, gathered on the ground in the course of the advance of the press. When the bale has attained the desired diameter and has been bound, the rear gate of the press is opened and the bale is ejected onto the ground. The formation of another bale by rolling up can then begin inside the press.

Although, throughout the description, the term "belts" is used for greater simplicity to designate the elements which bring about the formation of the bale by rolling up within the chamber of the press, it will be understood that the invention is also concerned with machines in which other elements, such as chains, for example, are used for this purpose.

In order to ensure the formation of bales having a satisfactory density, that is to say in which the rolled up harvest products are sufficiently compacted to provide the required cohesion, avoiding all disintegration or all crumbling of the bale of forage or other material on the ejection thereof from the press onto the ground and during its subsequent handling, it is usual to subject certain of the guide rollers of the press to a biasing action which is designed to produce in the belts a tension which itself produces the compacting of the harvest products while they are being rolled up. The means which produce this biasing effect on the movable guide rollers of the press thus resist the increase in the volume of the baleforming chamber and compress the harvest products being rolled up by the tension exerted in the belts.

The density of the bales formed in a press is usually adjustable by biasing means, such as hydraulic cylinders or springs, for the guide rollers.

In the course of the operation of the press, it may happen, especially when the biasing means has been adjusted to form very dense bales and when operating the press during high humidity or when "lumps" or "packs" of harvest products are present in the windrow, that the torque delivered by the driving shaft of the press undergoes a violent increase. This violent increase in the torque then has to be compensated for by slip in the main clutch of the press. For obvious reasons, it seems to be preferable to avoid such loading of the main clutch of the press which if repeated many times results in harmful wear and tear which in turn is liable to reduce its working life.

The object of the invention is to overcome this disadvantage and to provide a press for forming cylindrical or round bales which comprise means for limiting this violent increase in the resisting torque on the driving shaft of the press resulting from an accumulation of harvest products or unfavorable working conditions.

Consequently, the invention is concerned with a press for forming cylindrical or round bales, comprising sets of bands, belts or the like which define a chamber for forming a bale by rolling up and pass over guide rollers at least one of which is driven from a main driving shaft, some of these guide rollers being movable tensioning rollers which are subjected to the action of biasing means for maintaining the belts under tension and characterized in that a resisting torque sensor is provided on the main driving shaft of the press and in that means operatively connected to this resisting torque sensor act on the biasing means of the tensioning rollers so as to adjust the biasing means in a sense that will reduce the tension of the belts when the resisting torque on the driving shaft of the press increases above a predetermined limit value.

In this case, there will usually be provided, in cooperation with one or more hydraulic tensioning cylinders forming part of the biasing means, an expansion valve in the form of an electrically operated pressure relief valve. According to a constructional form of the invention, the resisting torque sensor provided on the main driving shaft of the press generates an electrical output signal which is operatively connected to a solenoid for acting on said expansion valve so as to reduce or eliminate its response threshold when a resisting torque on the main driving shaft is sensed which exceeds a predetermined limit value. Each hydraulic tensioning cylinder acts on the movable guide rollers of the belts, usually via an arm or lever and the expansion valve is in the form of a pressure relief valve connected in shunt with the opposite ends of the tensioning cylinder. Thus, the reduction or setting at zero of the response threshold of the relief valve then produces at the same time a reduction of the working pressure of the associated hydraulic cylinder or cylinders in the same circuit and hence the tension of the belts passing over the guide rollers.

This reduction of tension enables the harvest products to be rolled up into a bale in a manner which takes into account the particular conditions which are encountered in the course of operation. As soon as the resisting torque on the main driving shaft falls once again below the predetermined limit value, the electrical output signal from the resisting torque sensor ceases to act on the expansion valve and the working pressure of the hydraulic cylinder or cylinders returns to its normal value.

According to a constructional variant, the electrical output signal of the resisting torque sensor is operatively connected to solenoid-operated shunt valve which is connected in parallel with the hydraulic tensioning cylinder or cylinders and with the expansion valve in the hydraulic circuit concerned, and this shunt valve is actuated, on the sensing of an excessive resisting torque on the main driving shaft of the press, so as to return to the reservoir the liquid delivered by the pump, causing the pressure in the cylinder or cylinders to fall and thereby effecting a reduction in tension of the belts. Here once again, as soon as the resisting torque sensed has fallen below the predetermined limit value, the shunt valve returns to its initial closed position and the pressure in the hydraulic cylinder or cylinders is thereafter regulated solely by the expansion valve.

The description which will follow, made with reference to the annexed drawings, and given non-limitatively, will enable the invention to be better understood.

DESCRIPTION OF THE PREFERRED EMBODIMENT

Figure 1:
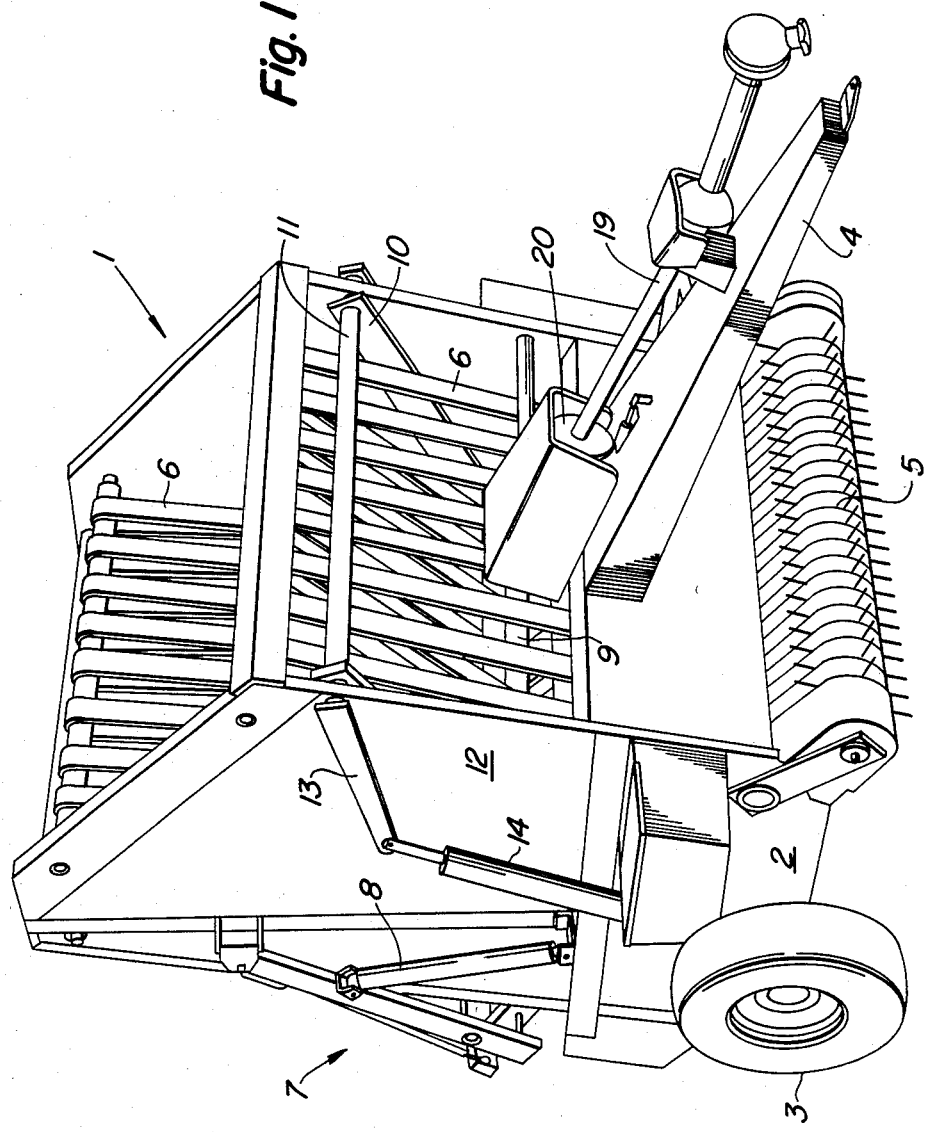
FIG. 1 is a perspective view of a press for forming cylindrical or round bales which is equipped according to the invention.

FIG. 1 shows a press for forming cylindrical or round bales, which press is indicated as a whole by the reference 1 and which has a front chassis 2 supported by wheels 3 and can be coupled by a tongue 4 to an agricultural tractor. This press has on its front part a pick-up 5 which gathers harvest products from the ground and feeds them to a press chamber where they are rolled up by endless flexible elements here shown in the form of bands or belts 6. A rear gate, indicated as a whole by the reference 7, is provided in a conventional manner on the rear part of the press. Coupled for lifting the gate 7 with a view to the discharge of a bale after it has been bound are cylinders 8.

In a manner which is conventional in presses of this type, certain of the guide rollers over which the belts 6 pass are movable and are subjected to a bias, so as to maintain the belts 6 under tension with a view to forming a bale which is sufficiently dense to preserve its cohesion, while nevertheless enabling the volume of the interior of the chamber of the press to increase in accordance with the increase in the diameter of the bale being formed.

In FIG. 1, a movable guide roller of this type has been indicated at 9. This roller is carried by levers 10 which are themselves keyed on a transverse shaft 11 which extends through the two sidewalls 12 of the press. Outside these sidewalls 12, the shaft 11 carries arms 13, the free ends of which are connected to hydraulic cylinders 14, only one shown, of substantial length.

Figure 2:
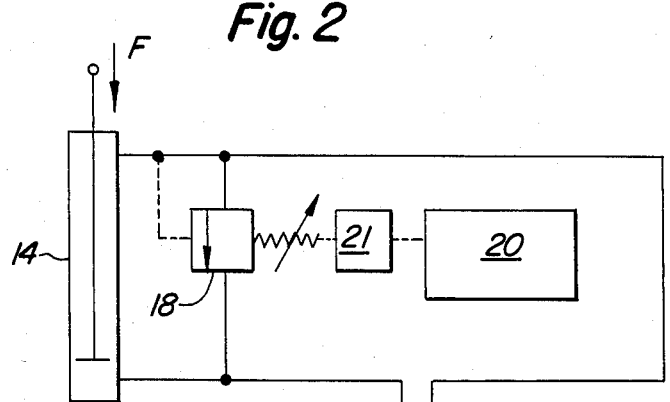
FIGS. 2 and 3 are diagrams of hydraulic circuits corresponding to two embodiments of the invention.
Figure 3:
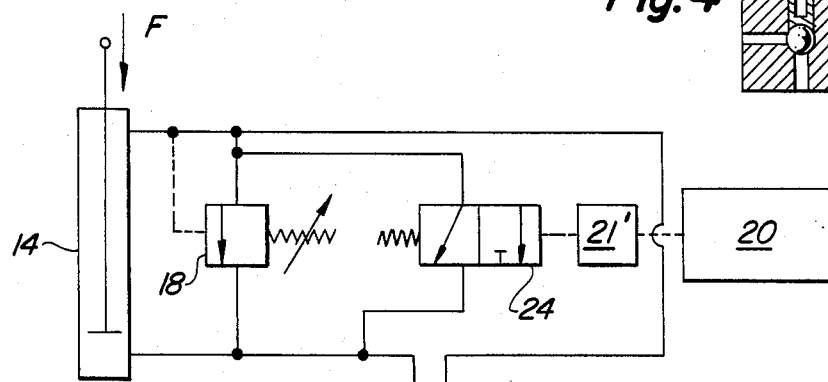

Referring now to the hydraulic circuit schematics shown in FIGS. 2 and 3, it can be seen that each hydraulic cylinder is supplied with liquid from a pump 15 via a control valve or distributor 16 which is manually operable by the driver of the tractor. This valve 16 can in known manner occupy three different positions, namely for feeding the hydraulic cylinders 14, only one being shown for simplicity, in one direction or the other, or for closing or isolating these hydraulic cylinders. The return of the liquid takes place in the direction of the reservoir 17. The direction in which the pressure acts in the hydraulic cylinders 14 in order to tension the belts has been indicated by an arrow F in FIGS. 2 and 3. An expansion or pressure relief valve 18 is provided in the hydraulic circuit in shunt with the hydraulic cylinders 14 and the pressure at which it responds is adjusted as a function of the desired tension in the belts, which in turn depends on the working conditions encountered. All these elements are known in presses of this type.

Also indicated in FIG. 1 by the reference 19 is the main driving shaft of the press, which is drivably connected to the power takeoff shaft of the agricultural tractor to which the press is coupled and which drives the stationary roller or rollers of the belts.

According to the invention, there is provided on the main driving shaft 19 of the press at torque sensor, which is indicated diagrammatically at 20 in FIG. 1. This sensor serves for sensing the resisting torque for the drive of the press and is set at a predetermined limit value so that it is responsive to a resisting torque which is preferably slightly lower than the torque which would cause slipping of the main clutch of the press. Torque sensors which provide an electrical response and which can be used for this application are well-known in the industry, for example, see British Pat. No. 2,086,569 dated 12 May 1982.

Figure 4:
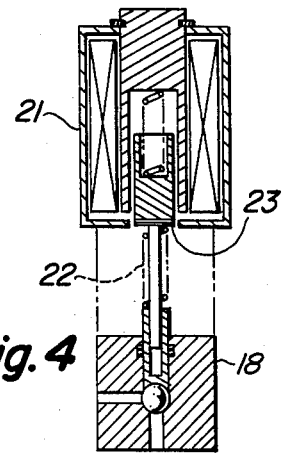
FIG. 4 is a somewhat schematic representation of a solenoid-controlled relief valve of a type usable in the circuit illustrated in FIG. 2.

Reference will now be made to FIGS. 2 and 4 which show one possible embodiment of the invention. According to this embodiment, the torque sensor, indicated diagrammatically at 20, is operatively connected by means of a solenoid 21 to the expansion valve 18 so as to transmit to this solenoid, when it responds, a signal which actuates the solenoid to effect retraction of its plunger and reduction of the setting of a spring 22 so as to reduce or eliminate the response pressure of the expansion valve. As can be seen in FIG. 4, the plunger of the solenoid 21 serves as the end stop for the spring 22 and retracts in response to a torque sensor signal so as to reduce the relief setting of the valve. This setting may be changed by stacking different numbers of shims 23 between the plunger and spring end.

Thus, when an excessive resisting torque is sensed on the main driving shaft of the press, for example, due to the sudden increase in volume the bale chamber is required to have on the entry into the chamber of a "lump" or "pack" of the harvest products such as may occur when very wet harvest products are being picked up, the signal produced by the torque sensor 20 is transmitted to the solenoid 21 associated with the expansion valve 18 so as to reduce or eliminate the response pressure of this expansion valve and hence to enable the liquid that provides the pressure in the hydraulic cylinders 14 to return to the lower end of each cylinder when the valve 16 is closed.

As a result of this reduction of pressure in the hydraulic cylinders 14, the tension of the belts 6 becomes less and the press can thus absorb the sudden excessive inflow of harvest products. When conditions have returned to normal, the resisting torque falls below the predetermined limit value and the signal produced by the torque sensor ceases to be applied to the solenoid 21 which is thus deactivated to permit the expansion valve to be restored to the response pressure defined by the setting of the spring 22. The pressure in the hydraulic cylinder thus reassumes its nominal value and the tension of the belts 6 is likewise restored for completing the formation of the bale.

In FIG. 3, the corresponding elements have been indicated by the same references as in FIG. 2. In this case, there is provided, in parallel with the expansion valve 18 and the hydraulic cylinders 14, a return valve, indicated diagrammatically at 24, which can occupy two different positions. In one of these positions, namely its normal position towards which it is normally biased, it blocks the discharge of the liquid. In its second position, in which it is subjected to the action of a solenoid 21' which has been energized by a signal emitted as previously indicated by the torque detector 20 on the sensing of an excessive resisting torque, it bypasses the expansion valve 18 and the hydraulic cylinder 14 and returns the liquid to the lower end of the latter. As a result of this, the working pressure of the hydraulic cylinder is reduced to zero and the tension of the belts 6 is diminished. As soon as the resisting torque reassumes an admissible value, the signal produced by the torque sensor disappears, the solenoid 21' is deactivated and the shunt valve 24 returns to its normal closed position. It is here noted that the solenoid 21' is similar to the solenoid 21 except that its plunger extends upon energization and a spring biases the plunger toward its retracted position.

Should the belt-tensioning mechanism use only variable springs such as those illustrated in U.S. Pat. No. 4,425,752 granted Jan. 17, 1984, the output of the torque sensor may be coupled for operating an electrically responsive device coupled for changing the anchor point of the springs to reduce their biasing force in response to a torque overload.

It is thus apparent that the invention provides a solution to the problem posed by the sudden variations in the resisting torque on the main driving shaft of cylindrical bale-forming presses, by the reduction of the tension of the belts, bands or the like. The response produced by the arrangement forming the subject of the invention is very rapid, as a result of which the main clutch of the press is protected. Moreover, as soon as the particular circumstances that caused the sudden increase in resisting torque cease to exist, the normal working conditions will be reestablished and the tension of the belts will be restored to the value determined by the setting of the adjusting means.

We claim:

1. A press for forming cylindrical or round bales, comprising sets of endless flexible elements which define a chamber for forming a bale by rolling up, and pass over guide rollers at least one of which is driven from a main driving shaft, some of these guide rollers being movable tensioning rollers which are subjected to the action of biasing means for maintaining the belts under tension, characterized in that a torque sensor is provided on the main driving shaft of the press and includes an output signal means for generating an electrical signal indicative of a torque exceeding a predetermined limit value;

electrically responsive bias relief means connected to receive the output signal of said torque sensor and being operable for acting on said biasing means of the tensioning rollers so as to adjust said biasing means in a sense that will reduce the tension of the belts when the resisting torque on the driving shaft of the press increases above said predetermined limit value.

2. The press according to claim 1 in which the biasing means includes at least one hydraulic cylinder and a fluid circuit including a valve means for connecting the opposite ends of the cylinder together, characterized in that the valve means is electrically responsive and the electrical signal of the torque sensor is connected to the valve means so as to effect operation of the valve means to interconnect the ends of the cylinder to reduce the pressure that tensions the belts when the resisting torque exceeds the predetermined limit value.

3. The press according to claim 2 wherein said valve means includes an expansion valve, including a preset biasing means, cooperating with the hydraulic cylinder for limiting the working pressure of the cylinder as determined by said preset biasing means of the valve; and said torque sensor being operatively connected to said expansion valve so as to reduce the bias of said preset biasing means in response to a resisting torque on the main driving shaft exceeding the predetermined limit value.

4. The press according to claim 2 wherein said valve means includes an electrically operated shunt valve coupled in parallel with the hydraulic cylinder and to receive the output signal of the resisting torque sensor and has two positions, in one of which the opposite ends of the hydraulic cylinder are interconnected, the shunt valve being brought into this one position when a resisting torque on the main driving shaft is sensed which exceeds the predetermined limit value.

5. The press according to claim 4 wherein said valve means also includes an expansion valve cooperating with the hydraulic cylinder to limit the working pressure of the cylinders; and said shunt valve also being connected in parallel with the expansion valve.

* * * * *